(12) United States Patent
Tamas et al.

(10) Patent No.: US 8,768,980 B2
(45) Date of Patent: Jul. 1, 2014

(54) PROCESS FOR OPTIMIZING FILE STORAGE SYSTEMS

(75) Inventors: Alexis Tamas, Paris (FR); Amaury Grimbert, Paris (FR)

(73) Assignee: STG Interactive S.A., Paris (FR)

( * ) Notice: Subject to any disclaimer, the term of this patent is extended or adjusted under 35 U.S.C. 154(b) by 547 days.

(21) Appl. No.: 12/938,295

(22) Filed: Nov. 2, 2010

(65) Prior Publication Data

US 2011/0106806 A1    May 5, 2011

Related U.S. Application Data

(60) Provisional application No. 61/257,141, filed on Nov. 2, 2009.

(51) Int. Cl.
*G06F 7/00*    (2006.01)
(52) U.S. Cl.
USPC .......................................................... 707/812
(58) Field of Classification Search
USPC .......................................................... 707/812
See application file for complete search history.

(56) References Cited

U.S. PATENT DOCUMENTS

| 2003/0033290 A1* | 2/2003 | Garner et al. ................ 707/3 |
| 2005/0144514 A1* | 6/2005 | Ulrich et al. ................ 714/6 |
| 2008/0152235 A1* | 6/2008 | Bashyam et al. ............ 382/224 |

* cited by examiner

*Primary Examiner* — Apu Mofiz
*Assistant Examiner* — Ajith Jacob
(74) *Attorney, Agent, or Firm* — Harness, Dickey & Pierce, P.L.C.

(57) ABSTRACT

A system includes a selection module, a file module, a storage cache, and an access module. The selection module organizes small files into groups according to a selection function, which organizes the small files based on at least one of related content of the small files, related filenames of the small files, and related access patterns of the small files. The file module uses a predetermined block size and stores, for each group, a large file containing all the small files of the group. The access module receives an access request for one of the small files from a client device and determines a large file corresponding to the one of the small files based on input from the selection module. The access module selectively reads the corresponding large file from the file module into the storage cache, and accesses the one of the small files from the large file.

18 Claims, 5 Drawing Sheets

PROCESS FOR OPTIMIZING FILE STORAGE SYSTEMS

CROSS-REFERENCE TO RELATED APPLICATIONS

This application claims the benefit of U.S. Provisional Application No. 61/257,141, filed on Nov. 2, 2009. The entire disclosure of the above application is incorporated herein by reference.

FIELD

The present disclosure is related to a storage system optimized for small files and more particularly to files that are small with respect to block size of an underlying file system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The document "Remote I/O Optimization and Evaluation for Tertiary Storage Systems through Storage Resource Broker" (Xiaohui Shen, Wei-keng Liao, and Alok Choudhary) published In Proceedings of IASTED Applied Informatics Conference, Innsbruck, Austria, February 2001, discloses a Meta Data Management System (MDMS) built on top of MultiPathI-O (MPH/O), a medium for secondary data access, and on top of Storage Resource Broker (SRB), a medium for tertiary data access.

User applications, typically scientific applications, access files through MPI-I/O or SRB. The user provides access pattern information/hints through the user application to MDMS, and then MDMS uses these hints to choose an optimal I/O approach. This prior art document discloses various optimization strategies, one of them applies to small files. The basic idea is that when these small files are created, the MDMS transparently concatenates these small files into one large superfile. So later on, when the user reads these small files, the first read call brings the large superfile in main memory, so the subsequent reads to other files can be copied directly from main memory. Two database tables are created in the MDMS to track contents of the superfile. This solution, as described, is specific to the SRB framework.

The document "Chamberlain R, Shands B. Streaming data from disk store to application. Proc. of 3rd Intl Workshop on Storage Network Architecture and Parallel I/Os; September 2005. pp. 17-23" discloses a network appliance (i.e., a specialized device for use on a network) called the Exegy K•Appliance™, that incorporates both magnetic storage and specialized hardware for examining the data stored in it.

In this network appliance, a Data Shift Register (DSR) that receives data streaming off the head at disk rotational speeds is associated directly with a disk head. The data in the DSR is made available to reconfigurable logic that performs low-level mining operations on the data that has been retrieved off the disk. The specific function performed by the reconfigurable logic will be tailored to the particular data mining application of interest. Also present in the system is a microprocessor that is used both for control duties (e.g., managing the function of the reconfigurable logic) and higher-level data mining operations. The host processor is responsible for managing the file system and maintaining the general functionality of the database, while the new embedded hardware is used primarily for high-volume mining operations.

This document discloses a mechanism for dealing efficiently with large numbers of small files by concatenating sets of small files together into a single large file for the purposes of data movement to the application. An index into the constructed concatenation is built, which allows the identification of the original file ID within the larger constructed file.

SUMMARY

When a large number of files are written into a file storage system, a problem concerning the number of file storage system blocks occupied arises when file sizes are smaller than the block size. For example: in a file storage system whose block size is 8 kB, 100 files of 1 kB each will occupy 100 blocks, i.e. 800 kB, which is eight times the cumulative size of the files. Moreover, when a file storage system contains a large number of files, the number of input/output operations can be very important at the file storage system level, proportionate to the number of files stored and used.

Using caching proxy servers may limit the load on the file storage system but managing a large number of files cached at the caching proxy server level can be very complex, for example, when it concerns the update or deletion of existing files. When files are logically related and are processed in a successive manner (example: files generated by the same user), the number of connections at the file storage system level is proportional to the number of processed files, without the possibility to limit this number.

Solutions in which a database is needed to index the small files in the superfile are prone to single point failure. Because the superfile alone has no information on how to read its own content, if the database is not accessible, then the small files can not be retrieved. For instance, the database may fail or be corrupted, or the superfile may be stored in a remote storage system in a network from which the database is not accessible. Such inaccessibility of the database would result in the user being unable to extract the small files from the superfile.

Solutions where small files are stored separately, but aggregated before transmission over a network, fail to achieve gains in storage size. Individual storage of the small files continues to be inefficient.

In accordance with the present disclosure, a process for optimizing file storage systems is provided. In one aspect, the solution involves combining a set of small files (called Si files), as well as an index for these Si files, into a single file (called an L file), and storing this L file in the file storage system. Thus, in general, the L file will occupy a smaller total number of blocks than if the Si files had been stored separately in the file storage system.

For example, in a file storage system whose block size is 8 kB, an L file combining 100 Si files of 1 kB each will occupy between 13 and 14 blocks (depending on the format of the index), i.e. between 104 kB and 114 kB, instead of 800 kB, thus representing a substantial savings of space in the file storage system. In this solution, when one of the Si files is requested, it is the entire L file that will be requested from the file storage system. By combining logically related Si files into an L file, accessing the L file (instead of successively accessing multiple Si files) will optimize input/output operations within the file storage system and will economize connections, as all of the Si files will be made available through a single connection.

This solution may not realize substantial space savings in the unlikely case where the sizes of the Si files are equal to or are multiples of the block size in the file storage system (in which case the L file size equals the sum of the Si file sizes plus the size of the index). However, even in this case, the input/output operations are still optimized within the file storage system and the connections are still economized. This solution is applicable for both centralized and distributed file storage systems. In various implementations, the L file is self-contained (i.e., Si files can be retrieved in the L file without access to a network or to an external index table). These implementations may provide a high level of reliability.

A method for storing multiple small files $S_i$ on a remote file storage system of at least one server, the remote file storage system using a predetermined block size includes gathering the small files $S_i$ into groups $G_p$ of interrelated small files $S_i$ according to a selection function SF. The selection function SF is based on a contextual relationship of at least one of content of the $S_i$ files and filenames of the $S_i$ files. For each group $G_p$, the method includes creating a large file $L_p$ containing all the small files of the $G_p$ group and saving the large file $L_p$ in the remote file storage system.

The selection function SF is defined in order to maximize the number of large files $L_p$ whose size is close to but not more than an integer multiple of the predetermined block size. For each new small file $S_a$ to be saved, the method includes applying to the $S_a$ file the selection function SF in order to determine the related group $G_p$; one of (i) loading from the remote file storage system the large file $L_p$ corresponding to the $G_p$ group and (ii) creating the large file $L_p$ corresponding to the $G_p$ group; adding the $S_a$ file to the large file $L_p$ to create a modified large file $L_p$; and saving the modified large file $L_p$ in the remote file storage system.

For each stored small file $S_a$ to be loaded, the method includes applying to the $S_a$ file the selection function SF in order to determine the related group $G_p$; loading from the remote file storage system the large file $L_p$ corresponding to the $G_p$ group; and extracting the $S_a$ file from the large file $L_p$. For each stored small file $S_a$ to be modified, the method includes applying to the $S_a$ file the selection function SF in order to determine the related group $G_p$; loading from the remote file storage system the large file $L_p$ corresponding to the $G_p$ group; extracting the $S_a$ file from the large file $L_p$; modifying the content of the $S_a$ file and replacing the $S_a$ file in the large file $L_p$ to create an updated large file $L_p$; and saving the updated large file $L_p$ in the remote file storage system.

In other features, each of the large files $L_p$ includes an index of the files $S_i$ stored in the large file $L_p$. The index records a filename of each of the files $S_i$ stored in the large file $L_p$ and an offset of each of the files $S_i$ within the large file $L_p$. Each of the large files $L_p$ is a concatenation of the index and the files $S_i$ together. The method further includes, when accessing one of the small files $S_a$, selecting a first server according to a load balancing function, and accessing the one of the small files $S_a$ via the first server. The first server reads the large file $L_p$ corresponding to the one of the small files $S_a$ from a common file storage system.

A method includes gathering related small files into groups according to a selection function. The selection function groups the related small files based on at least one of related content of the files and related filenames of the files. The method includes, for each group, saving a large file containing all the small files of the group into a file storage system. The file storage system uses a predetermined block size. The method includes accessing one of the small files by determining a corresponding group based on the selection function; and reading the large file of the corresponding group and accessing the one of the small files from the large file.

In other features, each of the large files includes an index of the files stored in the large file. The index records a filename of each of the files stored in the large file and an offset of each of the files within the large file. Each of the large files is formed by concatenating the index and the files together. The method further includes adjusting the selection function to maximize the number of large files whose size is close to but not more than an integer multiple of the predetermined block size.

A system includes a selection module, a file module, a storage cache, and an access module. The selection module organizes related small files into groups according to a selection function. The selection function organizes the small files based on at least one of related content of the small files, related filenames of the small files, and related access patterns of the small files. The file module stores, for each group, a large file containing all the small files of the group. The file module uses a predetermined block size. The access module receives an access request for one of the small files from a client device and services the access request by determining a large file corresponding to the one of the small files based on input from the selection module. The access module selectively reads the corresponding large file from the file module into the storage cache, and accesses the one of the small files from the large file.

In other features, the system includes a caching server that includes the storage cache and the access module. The caching server further includes nonvolatile storage that stores operating instructions for the caching server, and a network interface. The system further includes a load balancer that selectively routes the access request from the client device to the caching server.

In other features, the system further includes a file storage system includes the file module. Each of the large files includes an index of the small files stored in the large file. The index records a filename of each of the small files stored in the large file and an offset of each of the small files within the large file, and each of the large files is formed by concatenating the index and the files of the group together. The system further includes an optimization module that adjusts the selection function to minimize cumulative differences between sizes of large files and integer multiples of the predetermined block size.

In other features, the optimization module selectively evaluates the selection function when an optimization feature is enabled, the access module is idle, and a current percentage of wasted space is greater than a threshold. The optimization module evaluates modified versions of the selection function and chooses one of the modified versions of the selection function when a ratio of estimated wasted space for the chosen one of the modified versions of the selection function to the current percentage of wasted space is less than an improvement threshold. The improvement threshold is less than one. The access module reorganizes the small files into large files based on the chosen one of the modified versions of the selection function.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 2:
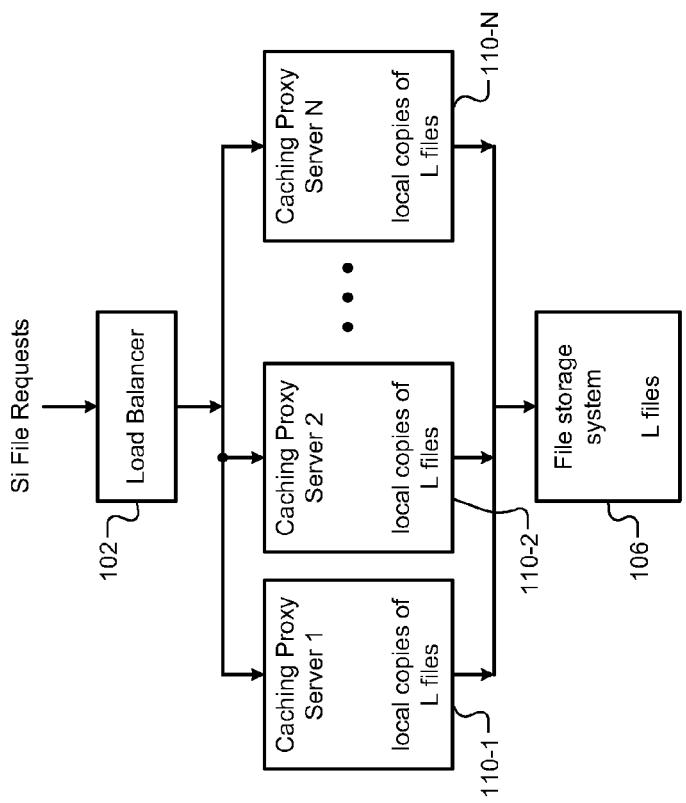
FIG. 2 shows a diagram of a distributed file storage system.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An example of the implementation of the solution within the context of a centralized file storage system is presented below. Although various forms of archive files can be used, such as ZIP or TAR, a simplified format may increase performance.

a) L File Structure

When Si files are combined into an L file, an index of Si files is constructed which includes, for each Si file, its file name and its offset in the L file. The content of the L file starts with this index. In this example, the index is constructed using a fixed scheme including separators. The index fields are of the type "file_name,offset_value". The index elements are separated by a semicolon ";". The end of the index is marked by an asterisk "*". The offset values, in bytes, can be defined such that the offset "0" corresponds to the first byte following the index in the L file.

After the index, the content of the L file is that of each Si file, one after another, without separators. The first Si file (file S1) is located just after the index, at the offset "0". The next Si file (file S2) is located at the offset "size_of_file_S1", and the following Si files are located at the offsets "offset_of_preceding_file+size_of_preceding_file".

Here is an example of the construction of an L file containing 3 Si files. In this example, so as to provide a better understanding of the construction method for the L file, the Si file sizes are very small, which will lead to an index file size that is relatively large as compared to the L file size (which would not likely be the case in a real world situation).

First Si file (file S1):
Name of file S1: "abcd.txt"
Content of file S1: "Content_file_1"
Size of file S1: 14 bytes
Offset of file S1: 0 bytes
Second S1 file (file S2):
Name of file S2: "foo.bar"
Content of file S2: "Content_2"
Size of file S2: 9 bytes
Offset of file S2: 14 bytes (=offset of file S1+size of file S1)
Third Si file (file S3):
Name of file S3: "noextension"
Content of file S3: "Content_Three"
Size of file S3: 13 bytes
Offset of file S3: 23 bytes (=offset of file S2+size of file S2)
Content of the index: "abcd.txt,0;foo.bar,14;noextension,23*"
Size of the index: 37 bytes
Content of L file:
"abcd.txt,0;foo.bar,14;noextension,23*Content_file__1Content__2Content_Three"
Size of L file: 73 bytes The index can also store its own size, the number of Si files as well as the size of each Si file (in order to be able to extract an Si file without needing to know the offset of the following Si file). It is also possible to include in the index checksums for the index itself and for each Si file, to allow their integrity to be verified. Numeric values in the index can be represented in binary form, which may save space. The solution allows for the storage of Si files whose content is binary.

b) Accessing the File Storage System

Figure 1:
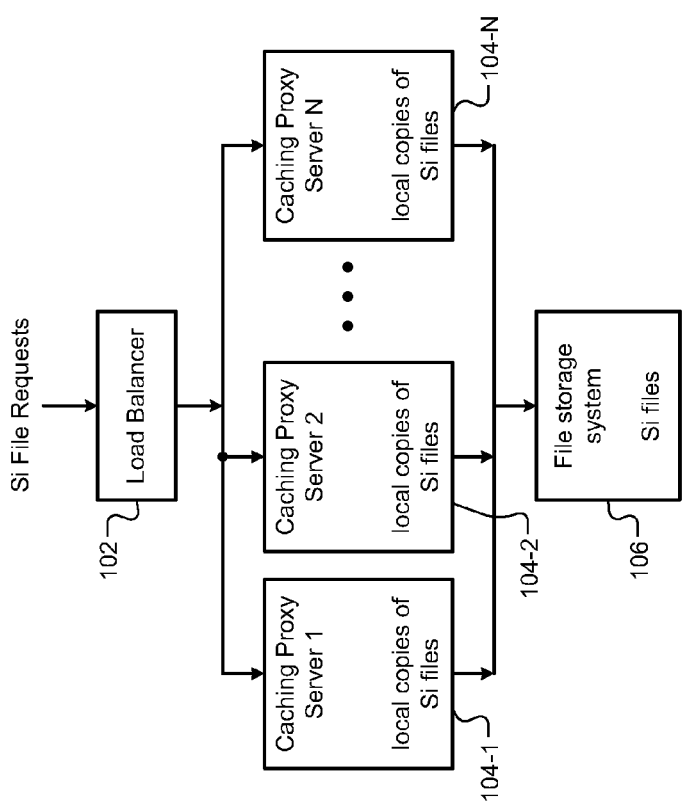
FIG. 1 shows a diagram of a distributed file storage system.

Traditionally, the reading of Si files from a file storage system would be done by means of a load balancer and a plurality of "n" caching proxy servers, themselves connected to the file storage system, according to FIG. 1. In this traditional functioning mode, the processing done at the level of each of these caching proxy servers starts with a first step of verifying if a local copy of the requested Si file exists in the caching proxy server. If the local copy exists, the Si file is returned directly by the caching proxy server. If the local copy of the Si file does not exist, in a second step, the caching proxy server requests the Si file from the file storage system and once the Si file is retrieved, the caching proxy server creates a local copy of the Si file (the Si file is cached) and returns the Si file. The persistence of the local copy of an Si file in a caching proxy server can depend on a number of factors such as the frequency of access to that Si file.

In the example of the implementation of the solution, the reading of Si files from a file storage system is also done by means of a load balancer and N caching proxy servers, where N is an integer greater than or equal to two. The N caching proxy servers are connected to the file storage system, according to FIGS. 2 and 8. In this functioning mode, the processing done at the level of each of these caching proxy servers starts with a first step of determining the name of an L file that contains the requested Si file, using logical relationships between Si files.

For example, if all Si file names begin with the same prefix, the name of the L file name may be this same prefix. This way, caching proxy servers can easily infer the L file name from any Si file name and thus optimize the retrieval process.

In a second step, the caching proxy server verifies if a local copy of the L file exists. If the local copy of the L file does not exist, the caching proxy server requests the L file from the file storage system and once the L file is retrieved, the caching proxy server creates a local copy of the L file (the L file is cached). In a third step, the caching proxy server proceeds with the extraction of the requested Si file from the local copy of the L file and returns the Si file. The persistence of the local copy of an L file in a caching proxy server can depend on a variety of factors, such as the frequency of access to the Si files contained in that L file.

In various implementations, writing, deleting, and updating an Si file are performed through the updating of the L file (corresponding to the Si file) in the file storage system and through the deletion of the local copies of the L file in the other caching proxy servers.

One application of the present disclosure is Frogans™, a multimedia data publishing system described in U.S. Pat. No. 7,774,358. In various implementations, Frogans™ uses files whose size is limited to 64 kB, and in which most are even smaller. The present disclosure may address two problems confronting Frogans™. First, storing such small files (i.e., less than 100 kB) may be inefficient depending on hardware or file system settings. Secondly, moving such files in a network context may lower performance, due to the fact that, for small size files, data access time is often higher than actual data transfer time.

Another application of the present disclosure is blogging platforms. Storing blog articles can involve large numbers of text files and small picture files, with file sizes typically in the range of a few kilobytes to 100 kB. One common solution for optimizing access time is to use caching proxy servers. However, this solution alone is costly and still implies inefficient storage and transfer of small files.

Another application of the present disclosure concerns text documents, such as scientific papers, patents, and other documents, and/or small data files. In various implementations, such document sizes range from a few kilobytes to 100 kB. In case of automatic linguistic translation, such documents are stored, accessed, and transferred from extremely large storage systems.

Referring back to FIG. 1, a load balancer 102 receives small file (Si) requests. The load balancer 102 distributes these access requests to caching proxy servers 104-1, 104-2, . . . 104-n (collectively, caching proxy servers 104). The caching proxy servers 104 acquire local copies of Si files from a file storage system 106. When one of the caching proxy servers 104 updates one of the Si files, copies stored in others of the caching proxy servers 104 are invalidated. Further, before the others of the caching proxy servers 104 can access the modified Si file, the Si file is either written to the file storage system 106 or provided directly to the others of the caching proxy servers 104.

Referring to FIG. 2, the load balancer 102 distributes Si file access requests to caching proxy servers 110-1, 110-2, . . . 110-n (collectively, caching proxy servers 110). The caching proxy servers 110 acquire local copies of L files from the file storage system 106. Each of the L files includes multiple Si files. In order to access one of the Si files, the caching proxy servers 110 read the corresponding L file from the file storage system 106. The caching proxy servers 110 then access the Si file via the local copy of the L file. Because the entire L file is stored as a local copy, access requests for other Si files from the L file can be serviced quickly. Further, as described in more detail below, storage of multiple Si files in a single L file may result in more efficient utilization of the file storage system 106.

Figure 3:
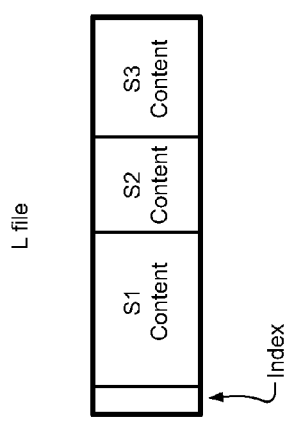
FIG. 3 is a graphical depiction of a large file.

Referring now to FIG. 3, an exemplary implementation of an L file is shown. The L file in this example is formed by concatenating an index segment with content of a first file S1, content of a second file S2, and content of a third file S3. The index stores information about the files S1, S2, and S3. For example, the index can store the file names, offsets, and sizes of the files S1, S2, and S3. In addition, the index can store additional metadata of the S1, S2, and S3 files and/or of the L file. For example only, metadata can include access times, modification histories, access rights, and/or file type information.

Figure 4:
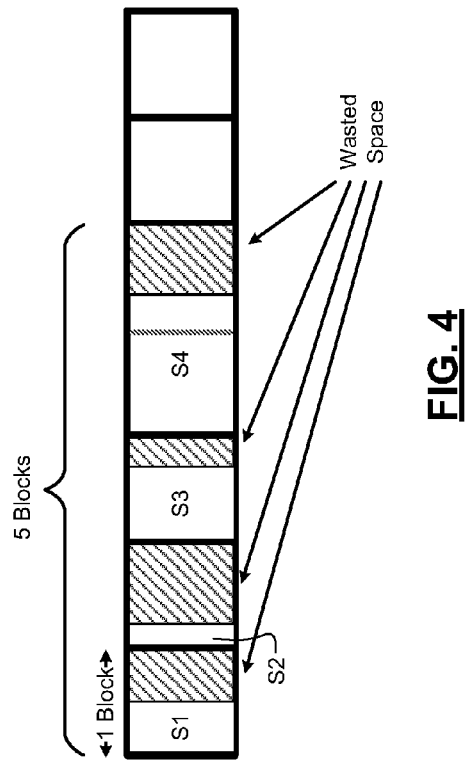
FIG. 4 is a graphical depiction of space usage when small files are stored separately.

Referring now to FIG. 4, seven blocks of an exemplary file system are shown. File S1 occupies approximately half of one block; however, the entire block is reserved for S1, thereby wasting the storage space of half of the block. File S2 occupies even less of a single block, thereby wasting even more space. S3 occupies more than half of the block; however, there is still wasted space in the block. File S4 occupies more than one block, thereby wasting space in the second block. Altogether, storing the files requires five blocks of storage spaces. If the block size were increased, the amount of wasted space could be even larger.

Figure 5:
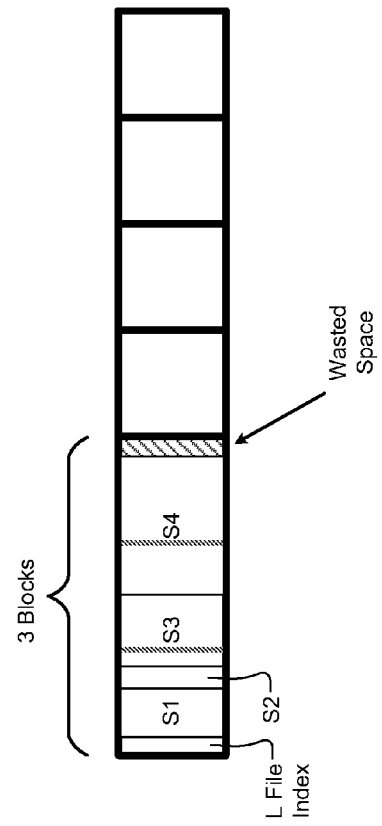
FIG. 5 is a graphical depiction of space usage when small files are stored as a group.

Referring now to FIG. 5, seven blocks of the exemplary file system, using the same block size as FIG. 4, are shown. In FIG. 5, the four files S1, S2, S3, and S4 are stored along with an index as a single file. Therefore, the file system is able to store the four files as an S file in only three blocks. This frees two blocks for additional storage when compared to FIG. 4. The underlying file system can be unaware that the stored L file actually includes four constituent small files, therefore requiring no changes to the underlying file system.

Figure 6:
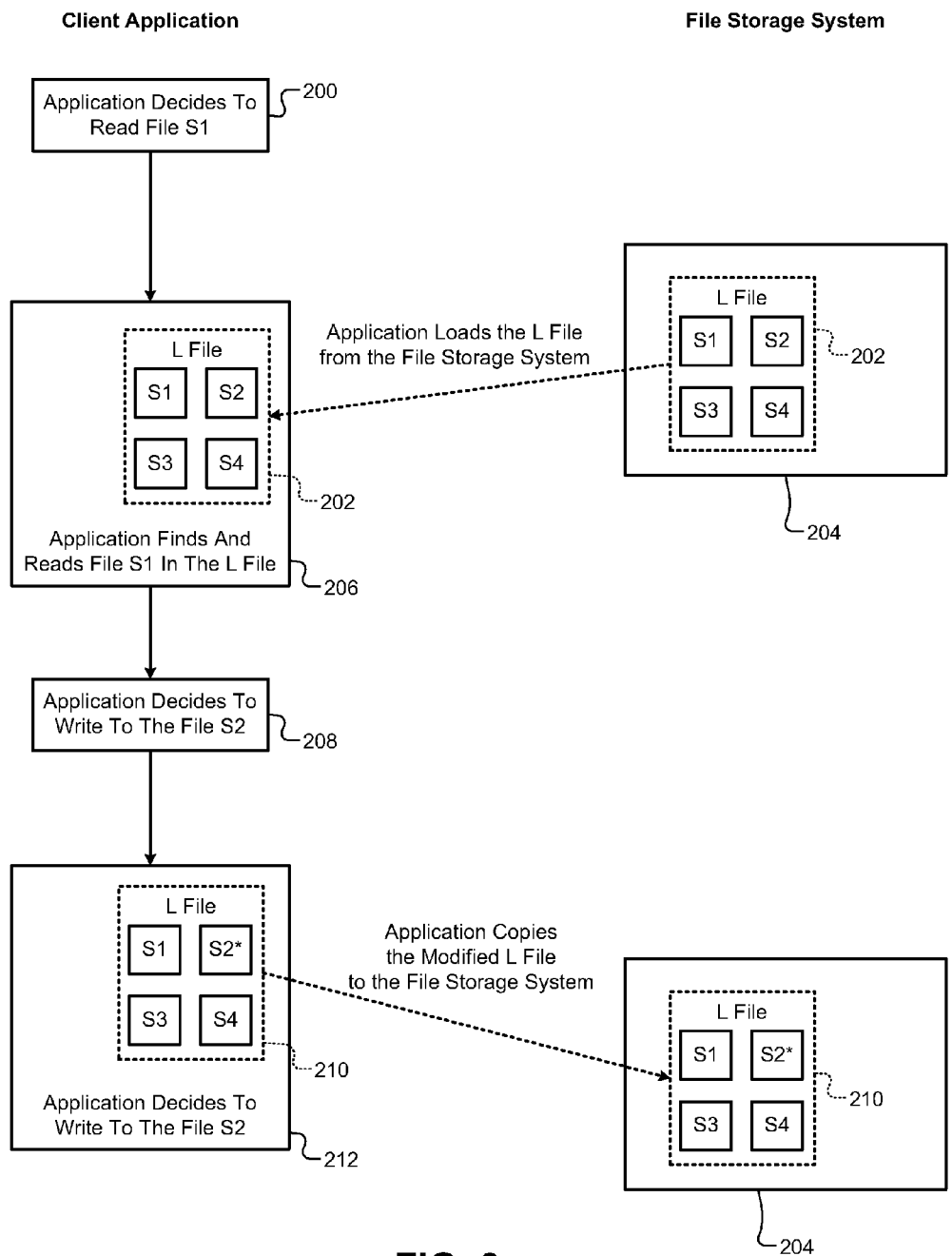
FIG. 6 is a graphical overview of functions performed on small files.

A simplified example of reading and then writing to small files within an L file is depicted. Referring now to FIG. 6, when a client application decides to read a small file S1 at 200, the application loads the corresponding L file 202 from a file storage system 204. At 206, the application reads file S1 from L file 202. At 208, the application decides to write to file S2. File S2 is located within the L file 202 and is therefore modified within the L file 202 to create a modified L file 210. At 212, the application copies the modified L file to the file storage system 204.

Figure 7:
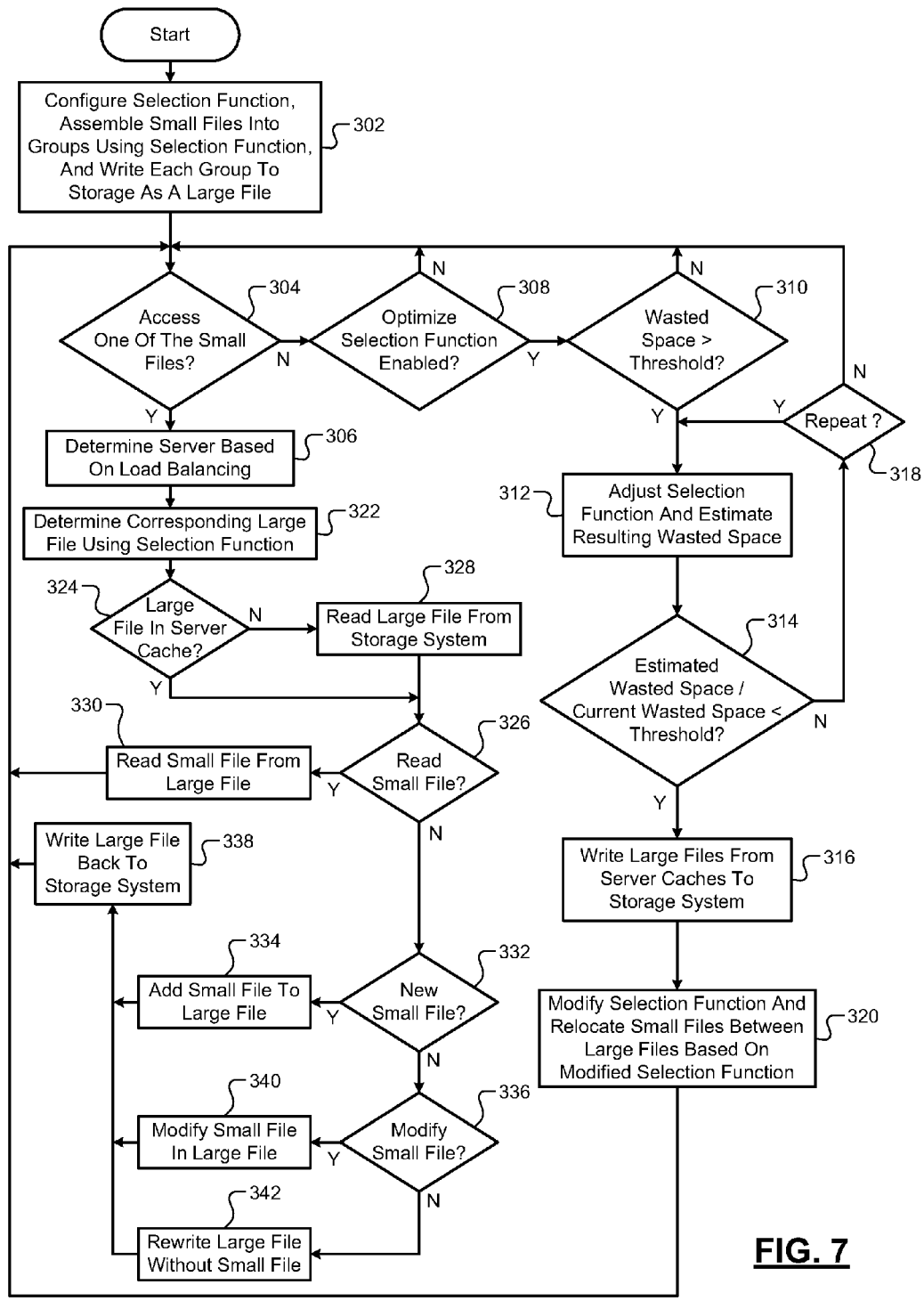
FIG. 7 is an exemplary flowchart depicting operation of a optimized storage system.

Referring to FIG. 7, a flowchart depicts example operation of the system according to the principles of the present disclosure. Control begins at 302 where a selection function is configured. For example only, the selection function may identify files as related based on file name, file type, subject matter, patterns or histories of common access, etc. At 302, small files are assembled into groups using a selection function and each group is written to storage as a large file.

As used herein, large file simply means a file that includes multiple small files. The term small file simply means a file that is a constituent of a large file. As an example only, small files may be less than 100 kB. As used herein, kB refers to kibibytes ($2^{10}$ bytes) instead of kilobytes ($10^2$ bytes).

Control continues at 304 where control determines whether access to one of the small files is desired. If so, control transfers to 306; otherwise, control transfers to 308.

At 308 control determines whether an optimized selection function is enabled. If so, control transfers to 310; otherwise, control returns to 304. Whether optimizing the selection function is enabled or not may be determined based on a mode setting and may also be determined based upon whether the system is idle. For example, optimizing the selection function may be postponed until the system is idle. Further, optimization of the selection function may be disabled by a switch or setting, such as to reduce power consumption.

At 310, control performs another test to determine whether optimization of the selection function is desirable. If so, control transfers to 312; otherwise, control returns to 304. For example, the test performed at 310 may be whether the wasted space is greater than a threshold. The threshold may be an absolute size, which may be based on the total size of the storage system. Alternatively, the threshold may be a percentage of the data stored in the storage system.

At 312, control performs a trial adjustment of the selection function and estimates the resulting wasted space if the adjusted selection function is used. At 314, control determines whether the estimated resulting wasted space is a significant enough improvement to justify implementing the adjusted selection function. If so, control transfers to 316; otherwise, control transfers to 318. The test used at 314 may be based on a ratio of the estimated wasted space to the current wasted space. If this ratio is less than a predetermined threshold, where the predetermined threshold is less than 1, use of the adjusted selection function may be considered worthwhile.

At 318, control determines whether adjustment of the selection function should be repeated. For example, there may be a finite number of different selection functions to be used, and at 318 control determines whether each of these selection functions has been tested. If additional adjustment remains, control transfers to 312; otherwise, control returns to 304.

At 316, control forces large files from server caches to the storage system. This results in the storage system having the most up-to-date versions of the large files from each of the server caches. At 320, control modifies the selection function based on the adjustment determined to be worthwhile, and relocates small files between the large file based on the modified selection function. In various implementations, the modified selection function may result in creation of a completely new set of large files. Control then returns to 304.

At 306, control provides the small file access request to a server based on load balancing concerns. Control continues at 322, where the large file corresponding to the small file to be accessed is determined using the selection function. At 324, control determines whether the large file is present in the cache of the selected server. If so, control transfers to 326; otherwise, control transfers to 328. At 328, control reads the large file from the storage system and continues at 326. At 326, control transfers to 330 if the small file access is a read; otherwise, control transfers to 332. At 330, control reads the small file from the corresponding large file and returns to 304.

At 332, control transfers to 334 when the small file access request is for a new small file; otherwise, control transfers to 336. At 334, control adds the small file to a corresponding large file based on the selection function. Alternatively, a new large file may be created into which the small file is placed. Control then continues at 338. At 338, control writes the large file back to the storage system so that other server caches can obtain the most recent large file for their caches. At 336, control determines whether the small file access request is a request to modify the small file. If so, control transfers to 340; otherwise, the request is a delete request and control transfers to 342. At 340, control modifies the small file within the large file and continues at 338. At 342, control rewrites the large file without the small file. In addition, the index is updated to remove reference to the small file. Control then continues at 338.

Figure 8:
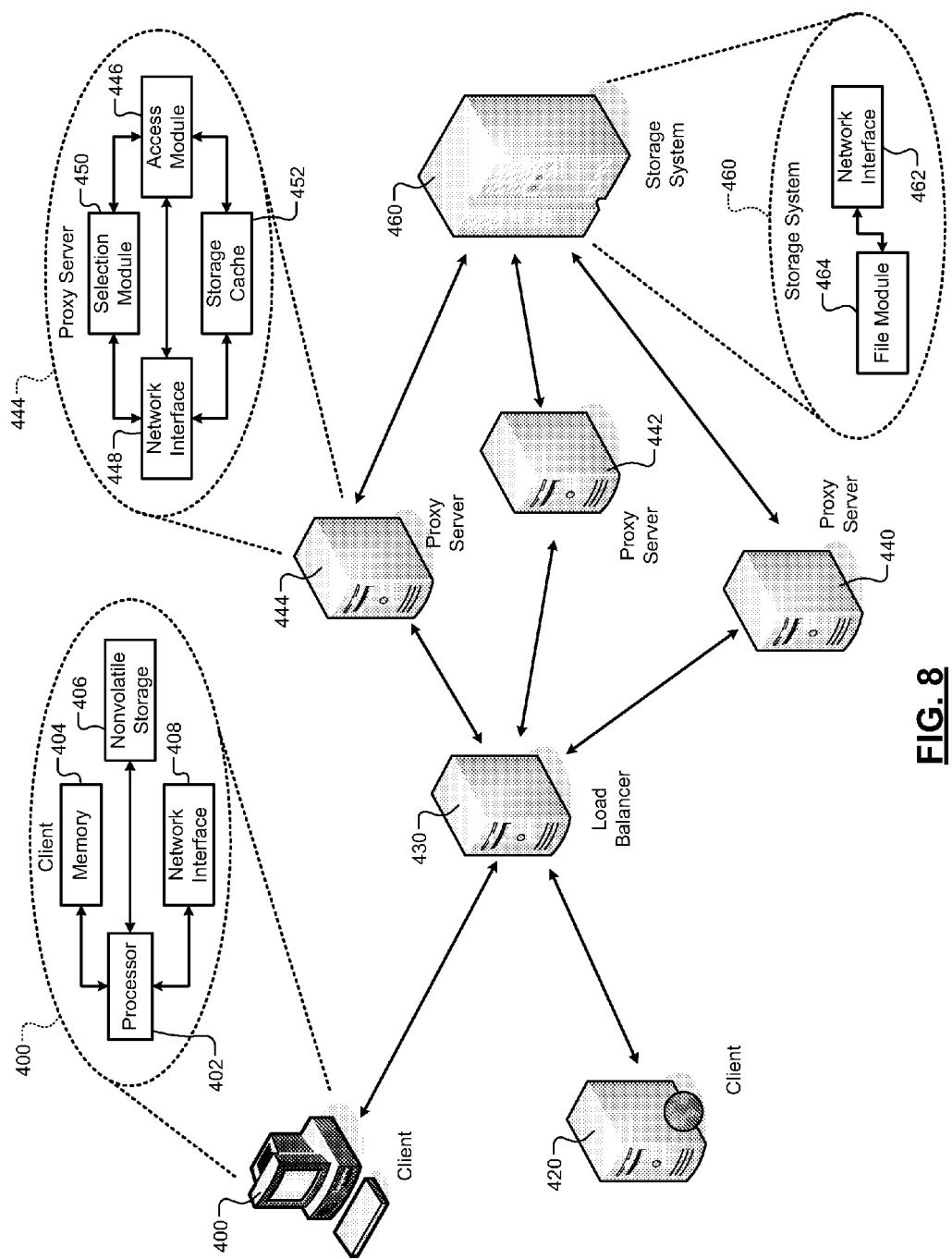
FIG. 8 is a high-level graphical block diagram of a system implementing an optimized storage system.

Referring now to FIG. 8, a simplified block diagram of an example implementation of a system according to the present disclosure is depicted. Clients 400 and 420 send small file access requests to a load balancer 430. The load balancer 430 assigns the small file requests to one of proxy servers 440, 442, and 444. Although more or fewer proxy servers can be used, three are shown for purposes of illustration only.

The proxy servers 440, 442, and 444 retrieve and store large files from and to a storage system 460. The large files are aggregates of small files. In various implementations, proxy servers 440, 442, and 444 provide an interface between small file accesses and large file accesses. In other words, the proxy servers 440, 442, and 444 interact with the clients 400 and 420 in terms of small files, and interact with the storage system 460 in terms of large files.

The clients 400 and 420 are graphically depicted as a personal computer and a server, respectively. However, in various implementations, clients can take many other forms, such as mobile devices. Further, although the term client is used, the client may not be the end consumer of information/data in the small files. For example only, the client 420 may be a web server that retrieves small files and presents them as part of a web page or web application to end users.

A simplified block diagram of selected components of the client 400 is illustrated for example only. Although depicted with respect to the client 400, similar or identical components can also be included in other clients, such as the client 420. The client 400, in this example, includes a processor 402 that executes instructions stored in memory 404 and/or nonvolatile storage 406. The processor 402 communicates with a network interface 408. When the processor 402 decides to access a small file, such as based on a user requested new content, the processor 402 transmits a small file access request to the load balancer 430 via the network interface 408.

In various implementations, the load balancer 430 may appear as a single server to the clients 400 and 420. Alternatively, the load balancer 430 may be bypassed or omitted, and the clients 400 and 420 may communicate with one or more of the prosy servers 440, 442, 444. For purposes of illustration only, selected components of the proxy server 444 are depicted. In this example, an access module 446 receives a small file access request via a network interface 448.

The access module 446 determines large files corresponding to the specified small file according to a selection function from a selection module 450. The selection module 450 may configure the selection function so that files expected to be accessed contemporaneously are grouped into a large file. For example only, files related to a web page may be grouped into a large file. Similarly, files that may often be accessed in succession as a user navigates a website may be grouped into a single large file. The access module 446 then accesses the corresponding large file from a storage cache 452. When the storage cache 452 does not include the large file, the large file is read from the storage system 460.

For purposes of illustration only, the storage system 460 is shown as including a network interface 462 and file module 464. The file module 464 may implement a variety of file systems, such as FAT, NTFS and/or ext2. The file module 464 may include a variety of nonvolatile storage media, such as tape optical disk and magnetic storage. The file module 464 may implement a variety of storage techniques, such as RAID (redundant array of independent disks). The file module 464 may be unaware of the content of any of the large files and simply treat them as standard files.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method for storing multiple small files $S_i$ on a remote file storage system of at least one server, the remote file storage system using a predetermined block size, the method comprising:
   gathering the small files $S_i$ into groups $G_p$ of interrelated small files $S_i$ according to a selection function SF, wherein the selection function SF is based on a contextual relationship of at least one of content of the $S_i$ files and filenames of the $S_i$ files;
   for each group $G_p$, creating a large file $L_p$ containing all the small files of the $G_p$ group and saving the large file $L_p$ in the remote file storage system, wherein the selection function SF is defined in order to maximize the number of large files $L_p$ whose size is close to but not more than an integer multiple of the predetermined block size;
   for each new small file $S_a$ to be saved:
      applying to the $S_a$ file the selection function SF in order to determine the related group $G_p$;
      one of (i) loading from the remote file storage system the large file $L_p$ corresponding to the $G_p$ group and (ii) creating the large file $L_p$ corresponding to the $G_p$ group;
      adding the $S_a$ file to the large file $L_p$ to create a modified large file $L_p$; and
      saving the modified large file $L_p$ in the remote file storage system;
   for each stored small file $S_a$ to be loaded:
      applying to the $S_a$ file the selection function SF in order to determine the related group $G_p$;
      loading from the remote file storage system the large file $L_p$ corresponding to the $G_p$ group; and
      extracting the $S_a$ file from the large file $L_p$; and
   for each stored small file $S_a$ to be modified:
      applying to the $S_a$ file the selection function SF in order to determine the related group $G_p$;
      loading from the remote file storage system the large file $L_p$ corresponding to the $G_p$ group;
      extracting the $S_a$ file from the large file $L_p$;
      modifying the content of the $S_a$ file and replacing the $S_a$ file in the large file $L_p$ to create an updated large file $L_p$; and
      saving the updated large file $L_p$ in the remote file storage system.

2. The method of claim 1 wherein each of the large files $L_p$ includes an index of the files $S_i$ stored in the large file $L_p$.

3. The method of claim 2 wherein the index records a filename of each of the files $S_i$ stored in the large file $L_p$ and an offset of each of the files $S_i$ within the large file $L_p$.

4. The method of claim 2 wherein each of the large files $L_p$ is a concatenation of the index and the files $S_i$ together.

5. The method of claim 1 further comprising, when accessing one of the small files $S_a$, selecting a first server according to a load balancing function, and accessing the one of the small files $S_a$ via the first server, wherein the first server reads the large file $L_p$ corresponding to the one of the small files $S_a$ from a common file storage system.

6. A method comprising:
   gathering related small files into groups according to a selection function, wherein the selection function groups the related small files based on at least one of related content of the files and related filenames of the files;
   for each group, saving a large file containing all the small files of the group into a file storage system, wherein the file storage system uses a predetermined block size;
   accessing one of the small files by:
      determining a corresponding group based on the selection function; and
      reading the large file of the corresponding group and accessing the one of the small files from the large file; and
   in response to a current percentage of wasted space exceeding a threshold, selectively (i) evaluating modified versions of the selection function and (ii) choosing one of the modified versions of the selection function for use by the gathering and the accessing, wherein the one of the modified versions of the selection is chosen so as to maximize the number of large files whose size is close to but not more than an integer multiple of the predetermined block size.

7. The method of claim 6 wherein each of the large files includes an index of the files stored in the large file.

8. The method of claim 7 wherein the index records a filename of each of the files stored in the large file and an offset of each of the files within the large file.

9. The method of claim 7 wherein each of the large files is formed by concatenating the index and the files together.

10. A system including a processor, the system comprising:
   a selection module, implemented by instructions executed on the processor, that organizes related small files into groups according to a selection function, wherein the selection function organizes the small files based on at least one of related content of the small files, related filenames of the small files, and related access patterns of the small files;
   a file module that stores, for each group, a large file containing all the small files of the group, wherein the file module uses a predetermined block size;
   an optimization module that, in response to a current percentage of wasted space exceeding a threshold, selectively (i) evaluates modified versions of the selection function and (ii) chooses one of the modified versions of the selection function for use by the selection module, wherein the optimization module chooses the one of the modified versions so as to maximize the number of large files whose size is close to but not more than an integer multiple of the predetermined block size;
   a storage cache; and
   an access module that receives an access request for one of the small files from a client device and services the access request by:
      determining a large file corresponding to the one of the small files based on input from the selection module;
      selectively reading the corresponding large file from the file module into the storage cache; and
      accessing the one of the small files from the large file.

11. The system of claim 10 wherein the system comprises a caching server that includes the storage cache and the access module and wherein the caching server further comprises nonvolatile storage that stores operating instructions for the caching server, and a network interface.

12. The system of claim 11 further comprising a load balancer that selectively routes the access request from the client device to the caching server.

13. The system of claim 11 wherein the system further comprising a file storage system comprising the file module.

14. The system of claim 10 wherein each of the large files includes an index of the small files stored in the large file.

15. The system of claim 14 wherein the index records a filename of each of the small files stored in the large file and an offset of each of the small files within the large file, and wherein each of the large files is formed by concatenating the index and the files of the group together.

16. The system of claim 10 wherein the optimization module waits to evaluate the modified versions of the selection function until an optimization feature is enabled and the access module is idle.

17. The system of claim 10 wherein the optimization module chooses the one of the modified versions of the selection function in response to a ratio of estimated wasted space for the chosen one of the modified versions of the selection function to the current percentage of wasted space is less than an improvement threshold, and wherein the improvement threshold is less than one.

18. The system of claim 10 wherein the access module reorganizes the small files into large files based on the chosen one of the modified versions of the selection function.

* * * * *